US011782683B1

(12) United States Patent
Lichtenau et al.

(10) Patent No.: US 11,782,683 B1
(45) Date of Patent: Oct. 10, 2023

(54) VARIABLE REPLACEMENT BY AN ARTIFICIAL INTELLIGENCE ACCELERATOR

(71) Applicant: INTERNATIONAL BUSINESS MACHINES CORPORATION, Armonk, NY (US)

(72) Inventors: Cedric Lichtenau, Stuttgart (DE); Preetham M. Lobo, Bangalore (IN); Razvan Peter Figuli, Remchingen (DE); Puja Sethia, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 17/656,358

(22) Filed: Mar. 24, 2022

(51) Int. Cl.
G06F 8/36 (2018.01)
(52) U.S. Cl.
CPC ..................... G06F 8/36 (2013.01)
(58) Field of Classification Search
None
See application file for complete search history.

(56) References Cited

U.S. PATENT DOCUMENTS

| 11,615,038 | B2* | 3/2023 | Tørudbakken | G06F 9/3851 370/389 |
| 2021/0065767 | A1* | 3/2021 | Troia | G06N 3/06 |
| 2021/0109791 | A1* | 4/2021 | Cheng | G06N 5/04 |
| 2021/0303284 | A1* | 9/2021 | Rodgers | G06F 8/451 |
| 2023/0185778 | A1* | 6/2023 | Mishra | G06F 16/217 707/769 |

FOREIGN PATENT DOCUMENTS

| CN | 113467783 A | 10/2021 |
| WO | 2020005806 A1 | 1/2020 |

OTHER PUBLICATIONS

Mahajan, "TABALA: A Unified Template-based Framework for Accelerating Statistical Machine Learning", IEEE, 2016 (Year: 2016).*
Anonymous: "Lookup table—Wikipedia" Mar. 11, 2022 (Mar. 11, 2022), XP093049940, Retrieved from the Internet: URL:https://en.wikipedia.org/w/index.php?title=Lookup_table&oldid=1076479618 [retrieved on May 26, 2023] the whole document.
International Application No. PCT/EP2023/057122, Notification of Transmittal of the International Search Report and Written Opinion, dated Jun. 6, 2023, 11 pgs.

(Continued)

Primary Examiner — Hossain M Morshed
(74) Attorney, Agent, or Firm — Kimberly S. Zillig

(57) ABSTRACT

A system for variable replacement in a template artificial intelligence (AI) accelerator code. The system includes: at least one memory; at least one processor communicatively coupled to the at least one memory, and configured for computing at least one table of variables from a template AI accelerator code; and an AI accelerator including a plurality of engines, and communicatively coupled to the at least one processor and the at least one memory. The AI accelerator is configured to create a variable replaced AI accelerator code for the plurality of engines of the AI accelerator from the template AI accelerator code by replacing variables in the template AI accelerator code with actual values from the at least one table of variables.

20 Claims, 17 Drawing Sheets

(56) References Cited

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.
S. Venkataramani et al., "RaPiD: AI Accelerator for Ultra-low Precision Training and Inference," 2021 ACM/IEEE 48th Annual International Symposium on Computer Architecture (ISCA), 2021, pp. 153-166, doi: 10.1109/ISCA52012.2021.00021.

\* cited by examiner

Latch bank 214

Stage 0
218A

Stage 1
218B

Stage 2
218C

Stage 3
218D

Variable number grouping per stage

| Stage0 Variable | Binary | Stage1 Variable | Binary | Stage2 Variable | Binary | Stage3 Variable | Binary |
|---|---|---|---|---|---|---|---|
| 0 | 0000000 | 32 | 0100000 | 64 | 1000000 | 24 | 0011000 |
| 1 | 0000001 | 33 | 0100001 | 65 | 1000001 | 25 | 0011001 |
| 2 | 0000010 | 34 | 0100010 | 66 | 1000010 | 26 | 0011010 |
| 3 | 0000011 | 35 | 0100011 | 67 | 1000011 | 27 | 0011011 |
| 4 | 0000100 | 36 | 0100100 | 68 | 1000100 | 28 | 0011100 |
| 5 | 0000101 | 37 | 0100101 | 69 | 1000101 | 29 | 0011101 |
| 6 | 0000110 | 38 | 0100110 | 70 | 1000110 | 30 | 0011110 |
| 7 | 0000111 | 39 | 0100111 | 71 | 1000111 | 31 | 0011111 |
| 8 | 0001000 | 40 | 0101000 | 72 | 1001000 | 56 | 0111000 |
| 9 | 0001001 | 41 | 0101001 | 73 | 1001001 | 57 | 0111001 |
| 10 | 0001010 | 42 | 0101010 | 74 | 1001010 | 58 | 0111010 |
| 11 | 0001011 | 43 | 0101011 | 75 | 1001011 | 59 | 0111011 |
| 12 | 0001100 | 44 | 0101100 | 76 | 1001100 | 60 | 0111100 |
| 13 | 0001101 | 45 | 0101101 | 77 | 1001101 | 61 | 0111101 |
| 14 | 0001110 | 46 | 0101110 | 78 | 1001110 | 62 | 0111110 |
| 15 | 0001111 | 47 | 0101111 | 79 | 1001111 | 63 | 0111111 |
| 16 | 0010000 | 48 | 0110000 | 80 | 1010000 | 88 | 1011000 |
| 17 | 0010001 | 49 | 0110001 | 81 | 1010001 | 89 | 1011001 |
| 18 | 0010010 | 50 | 0110010 | 82 | 1010010 | 90 | 1011010 |
| 19 | 0010011 | 51 | 0110011 | 83 | 1010011 | 91 | 1011011 |
| 20 | 0010100 | 52 | 0110100 | 84 | 1010100 | 92 | 1011100 |
| 21 | 0010101 | 53 | 0110101 | 85 | 1010101 | 93 | 1011101 |
| 22 | 0010110 | 54 | 0110110 | 86 | 1010110 | 94 | 1011110 |
| 23 | 0010111 | 55 | 0110111 | 87 | 1010111 | 95 | 1011111 |

00 in first two positions of binary code=stage0,
01 in first two positions of binary code=stage1,
10 in first two position of binary code=stage2,
11 in third and fourth positions of binary code=stage3

VARIABLE REPLACEMENT BY AN ARTIFICIAL INTELLIGENCE ACCELERATOR

BACKGROUND

The present disclosure relates generally to the technology of artificial intelligence (AI) accelerators, and more particularly to the replacement of variables in AI accelerator code with actual values within the AI accelerator itself, before execution of the code.

An artificial intelligence (AI) accelerator is a class of specialized hardware accelerator or computer system designed to speed up artificial intelligence applications using machine learning, machine vision, neural networks, etc. They are used for security, process automation, customer care, Internet of Things, robotics and other high-performance tasks. One of the essential tasks of the AI accelerator is to establish proper communication between the user and the device so as to execute tasks quickly and accurately.

SUMMARY

According to some embodiments of the disclosure, there is provided a system for variable replacement in a template AI accelerator code. The system includes: at least one memory; at least one processor communicatively coupled to the at least one memory, and configured for computing at least one table of variables from a template AI accelerator code; and an AI accelerator including a plurality of engines, and communicatively coupled to the at least one processor and the at least one memory. The AI accelerator is configured to create a variable replaced AI accelerator code for the plurality of engines of the AI accelerator from the template AI accelerator code by replacing variables in the template AI accelerator code with actual values from the at least one table of variables.

According to some embodiments of the disclosure, there is provided a system for variable replacement in a template artificial intelligence (AI) accelerator code. The system includes: at least one memory; at least one processor communicatively coupled to the at least one memory, and configured for computing at least one table of variables from a template AI accelerator code; and an AI accelerator including a plurality of engines, and communicatively coupled to the at least one processor and the at least one memory. The AI accelerator is configured to perform a method including replacing at least one portion of the template AI accelerator code with actual values from the at least one table of variables. The method also includes creating a variable replaced AI accelerator code, and providing the variable replaced AI accelerator code to the engines of the AI accelerator.

According to some embodiments of the disclosure, there is provided a method of variable replacement in a template AI accelerator code. The method includes an operation of providing at least one memory. The method also includes an operation of providing at least one processor communicatively coupled to the at least one memory, and configured for computing at least one table of variables from a template AI accelerator code. The method further includes an operation of providing an AI accelerator including a plurality of engines, and associated with the at least one processor and the at least one memory. The method also includes an operation of the AI accelerator creating a variable replaced AI accelerator code for the engines of the AI accelerator from the template AI accelerator code by replacing variables in the template AI accelerator code with actual values from the at least one table of variables.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 4 is a table of variable number grouping per stage, according to some embodiments of the present disclosure.

Figure 1:
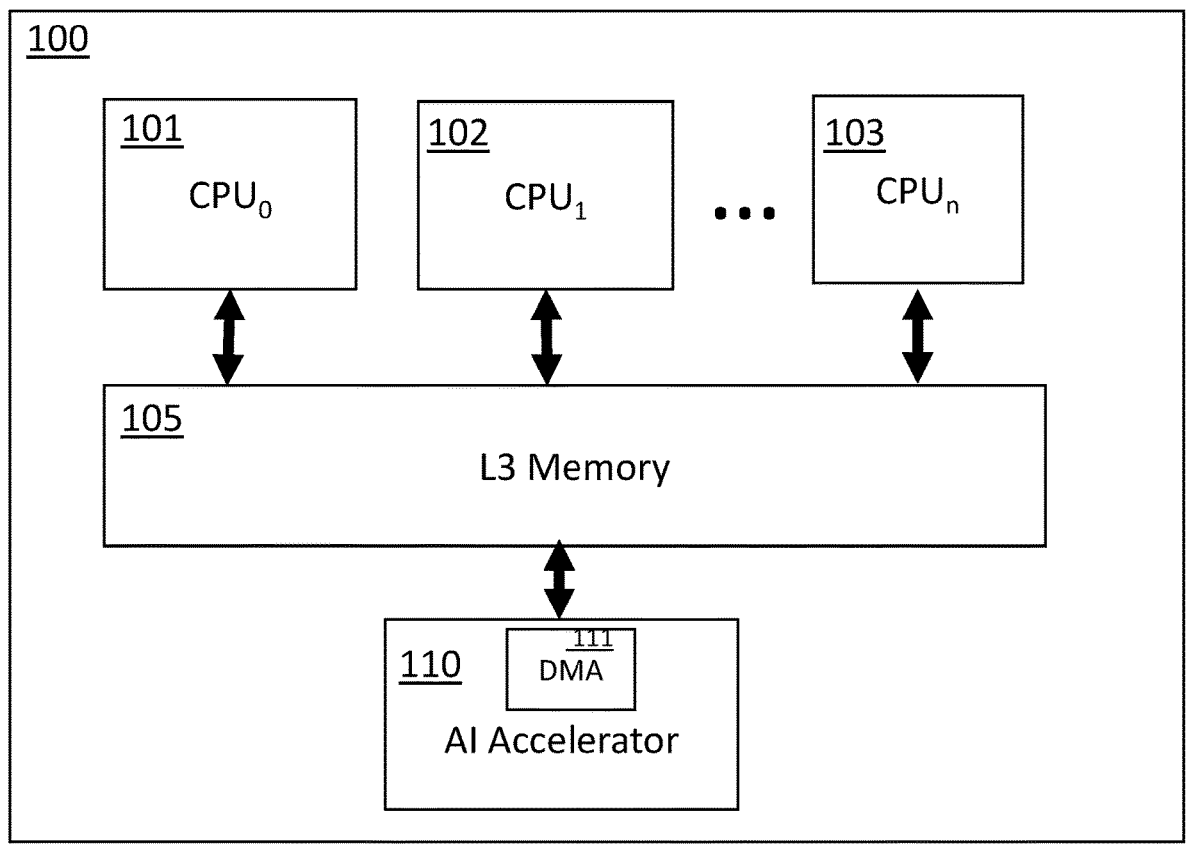
FIG. 1 is a block diagram illustrating a processor chip including an AI accelerator, according to some embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate generally to the field of AI accelerators, particularly to the replacement (or substitution) of variables in AI accelerator code with actual values within the AI accelerator itself, before execution of the code. While the present disclosure is not necessarily limited to such applications, various aspects of the disclosure can be appreciated through a discussion of various examples using this context.

AI accelerators can be designed to utilize codes to implement AI primitives. This allows for flexibility in the future to fix and enhance AI capability. Such codes can be generic enough to cover a wide range of (input/output) ("I/O") tensor dimensions to be usable for all AI models, or specific code can be generated for each tensor dimension. A tensor is a name for a data layout for the AI accelerator, such as an array. Preserving security and preventing the execution of arbitrary code on an AI accelerator can be a key requirement for particular AI accelerators and a value differentiator.

One can compile special code for an AI accelerator based on special tensor dimensions. A drawback of doing this, however, is that security is not guaranteed as one can execute arbitrary code on the AI accelerator or will need to put a full code validation and signing architecture and methodology in place. Also, bugs in such accelerator code cannot be transparently corrected as code is delivered "as-is," which can potentially cause machine stability issues.

With regard to variables in AI accelerator code, the code can be authorized or verified before execution by first replacing the variables. It can be very tedious and slow work to replace the variables as they can be spread all over the AI accelerator code, and may not be nicely byte-aligned. As a result of such a process of variable replacement, the start of the AI accelerator can be slowed down. A substitution would also be preferably done by trusted code and, as such, all variables would be verified as not to create security issues. Such a process of variable replacement would also not be backward compatible, which is desirable. Thus, a need exists for an improved process or structure for variable replacement of AI accelerator code prior to execution of the code by the AI accelerator.

Conventional processes for handling variables may not be feasible relating to AI accelerators. It is inefficient for a CPU, or other types of processor, to find variables in accelerator machine code and replace them with actual values because the CPU or processor is not aware of the internals of the accelerator machine code. Thus, there is also a need for variable replacement of AI accelerator code (i.e., template accelerator code, or templated AI accelerator code) within the AI accelerator itself.

Embodiments of the disclosure relate to AI instruction providing a number of high-level AI primitives to a user to be executed on an AI accelerator. The term AI primitive refers to basic function blocks that an AI model is typically composed of (e.g., matrix multiplication, convolution, sigmoid, etc.). Firmware can have template AI accelerator code for such high-level AI primitives that includes variables. User inputs (e.g., tensor, tensor size, AI operation, etc.) can be used by the firmware to compute variables for the AI accelerator code. Firmware can push the computed variables (or "variable lookup table") to the AI accelerator to be used with the template AI accelerator code. An AI initialization state machine (or "engine") can send the template accelerator code to variable-replacement hardware within the AI accelerator that parses the template accelerator code for variables. Actual values for the variables are then looked up in the variable lookup table and are inserted into the final accelerator code (i.e., variable replaced accelerator code) in the location of the associated variables. This process of variable replacement can occur in various cycles via a pipeline circuit to cover all variables in the template accelerator code while also meeting timing and physical wiring constraints.

One feature and advantage of the disclosed processes and systems for variable replacement is improved security and stability since only manufacturer-validated code can be executed thereon. Another feature and advantage of the disclosed processes and systems are backward compatibility when underlying AI accelerator architecture changes. Yet another feature and advantage of the disclosed processes and systems include performance benefits, as the final AI accelerator code (or usable machine code) does not need just-in-time (HT) compilation to adapt to workload parameters.

It is to be understood that the aforementioned advantages are example advantages and should not be construed as limiting. Embodiments of the present disclosure can contain all, some, or none of the aforementioned advantages while remaining within the spirit and scope of the present disclosure.

Turning now to the figures, FIG. 1 shows an embodiment of the disclosure, which is a block diagram representing a processor chip 100 including some components. The term "processor chip" as used herein refers to any semiconductor chip or die having one or more processors. The processor chip 100 shown includes a plurality of CPUs 101, 102, 103 (indicated respectively as $CPU_0$, $CPU_1$ ... CPUn, where n is any positive integer), a Level 3 (L3) memory 105 (i.e., Level 3 cache memory), and an AI accelerator 110. It should be noted that the CPU can alternatively be any suitable processor. The AI accelerator 110 can be connected to the L3 memory 105 via a direct memory access (DMA) interface 111. "Cache memory" is a faster and smaller segment of memory with access time that can be slower than registers but faster than a main memory. "L3 cache memory" is a third level of cache memory that is present outside a CPU and shared by all cores of the CPU. Other possible components of the processor chip 100 are contemplated but are not shown or discussed.

An AI accelerator, such as AI accelerator 110, can be used for processing a complex calculation task, and makes up for the deficiency of a CPU in processing complex mathematical calculations. In particular, the information processing capability of AI accelerators can be based on deep learning, and can greatly improve the recognition capability of a CPU for images and voices, for example. AI accelerators can be designed to execute machine code or programmable instructions. The AI accelerator 110 can implement an AI primitive on a hardware systolic array architecture. The machine code can be generic enough to cover a wide range of I/O tensor dimensions. Such flexibility can be provided by having variables in the machine code.

AI accelerators include hardware, such as to perform arithmetic operations, for example. Since the workload of an AI accelerator is complex, it also needs a software component. AI software can control available engines that perform tasks or do work. When an AI workload (e.g., convolution of a given tensor with another tensor) needs to be executed, the firmware that is running on a CPU (not visible to the user) needs a way to engage the AI accelerator by sending a program to the AI accelerator. The template accelerator code, or machine code, can be executed while firmware pre-fetches data into the cache (e.g., L3 memory) so that the AI accelerator can easily access the data without having to wait too long.

It is contemplated that instead of including one or more CPUs, the disclosed system can include any number of suitable types of "processor." It is contemplated that the system can include custom logic, e.g., implemented in an application-specific integrated circuit (ASIC) or a field-programmable gate array (FPGA) or a graphics processing unit (GPU).

Figure 2:
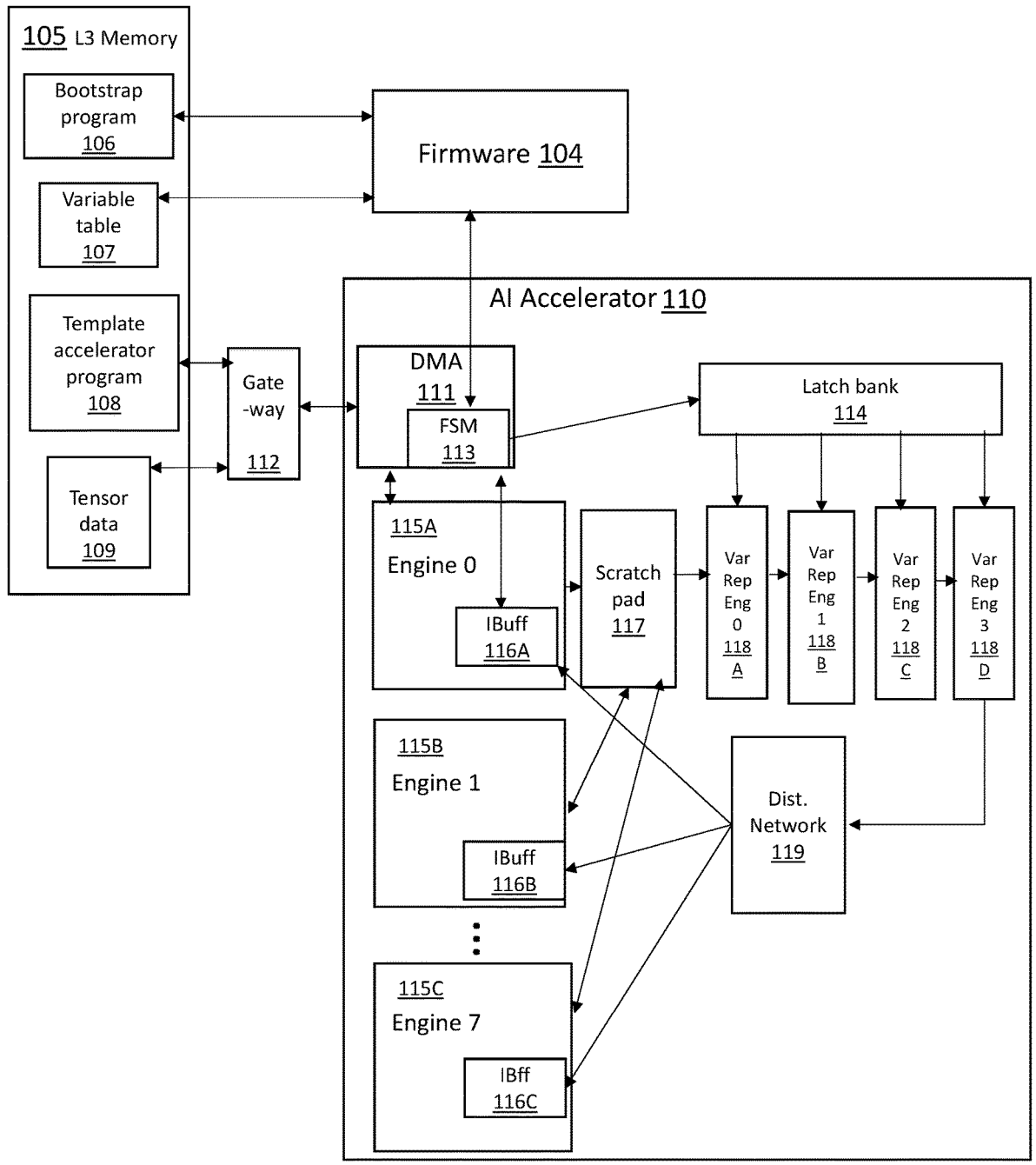
FIG. 2 is a block diagram illustrating a system including an AI accelerator with hardware for variable replacement, according to some embodiments of the present disclosure.

FIG. 2 is a block diagram illustrating a system including an AI accelerator 110 with hardware in order to perform variable replacement "on the fly" within the AI accelerator 110. The figure also includes the L3 memory 105 (as in FIG. 1), and firmware 104, in order to illustrate that other components in a processor chip, for example, like processor chip 100 of FIG. 1, interact with the AI accelerator 110.

The firmware 104 (e.g., on one or more CPUs, like those in FIG. 1) can reside in a restricted area of memory. The firmware 104 can push a bootstrap program 106, e.g., embedded in a large command, to the AI accelerator 110. "Boot strap program or code" refers to a very small startup code that causes the AI accelerator to autonomously fetches the actual larger templated accelerator code 108 and start execution of the same. The firmware 104 can also prepare or compute a variable lookup table 107 and push that to the L3 memory 105 and the AI accelerator 110. A "variable lookup table" can be defined as a table containing variable values (i.e. actual values) with the purpose of substituting parts of template accelerator code. In some embodiments, the variable values can be generated by firmware. The firmware 104 pushes the variable lookup table 107 into the AI accelerator 1010 through the DMA interface 111. The FSM 113 within the DMA interface 111 directs the variable lookup table 107 to the latch bank 114 (otherwise referred to more generally as "memory storage," to include, e.g., memory elements, random access memory (RAM), an array, etc.). The variable lookup table 107 is delivered to a latch bank 114 from the FSM 113. The term "latch bank" refers to a set of latches with the same logical nature. The latch bank 114 can hold variables, with 96×16 bit variables, as one example. Other suitable sizes or amounts of variables are contemplated and are not limited to those disclosed herein.

A template accelerator code (or program) 108 and tensor data 109 from a user, both shown in the L3 memory 105, can be fetched by DMA interface 111 of the AI accelerator 110 through a gateway 112 to the cache system. The template accelerator code 108 and the tensor data 109 are moved, e.g. through engine 0 115A to be stored in a static random access memory (SRAM)-based scratchpad 117.

In order to start to perform, or trigger, variable replacement of the template accelerator code 108, the AI accelerator 110 starts initialization by reading initialization data flits ("init flits" or "init data flits") of the template accelerator code 108 from the scratchpad 117. One init flit can be one 128 byte data line of the template accelerator code 108. Controls can be generated by the FSM 113, which can interpret the type of the init flit. Each init flit can be checked for a header, which can contain information about the target engines and the types and lengths of subsequent init flits by the FSM 113. The header can contain formation about how many init flits are going to come after the header. Another specific type of init flit can be a special-purpose register (spr) flit that contains the configuration information. Another type of init flit is a local register file (lrf) that contains register inrail values. Yet another type of init flit is called an instruction flit that contains actual templated code.

Each init data flit can enter into a first of a plurality of variable replacement engines/stages that make up the variable replacement hardware (such as variable replacement engines 118A-D) and can then enter into subsequent engines/stages. The disclosed process of variable replacement is described as being operable in a "pipeline" because each init flit enters the first stage, stage 0 118A, or variable replacement engine 0, where it may possibly undergo variable replacement and then moves to the stage 1 118B or variable replacement engine 1 to possibly undergo variable replacement there, and so on. Each init flit continues to move through each of the variable replacement engines 0-3 118A-118D (or stages 0-3) until the variables are replaced with actual values. Each time an init flit moves to the next stage, or variable replacement engine, it leaves an opening for another init flit to enter the variable replacement engine. This process continues until all of the init flit of the template accelerator code 108 are processed and have had variables replaced with actual values, as necessary.

The init flit is intercepted by the variable-replacement hardware (variable replacement engines 118A-D) and parsed for variables, with the variables being looked up in the variable lookup table (or "look-up table") from the latch bank 114 in order to replace variables with actual values, when necessary. The "pipeline" includes a plurality of engines/stages through which init flit of the temporal accelerator code 108 is moved through stages 0-3 in which any variables are replaced with actual values, within the AI accelerator 110 itself. In the disclosed example, there are four (4) stages (stage 0-3) of the pipeline taking place in the four (4) variable replacement engines 118A-D, with each stage being able to replace 24 variables (out of 96 total variables) per stage. 96 total variables are used in the disclosed example, although other numbers of stages and variables are also contemplated.

Once the variable replacements are made in all of the init flit of the template accelerator code 108, the code is considered usable accelerator code, and can be referred to as "variable replaced machine code" or "variable replaced AI accelerator code." Each 128 byte init flit of variable replaced accelerator code can be forwarded to a distribution network 119 to be distributed to the engines 0-7 (115A-115C), or specifically to instruction buffers (IBuffs) 116A-C in the engine 0-7 (115A-C), respectively. Each 128 byte init flit can be divided or sliced into 8×16 byte slices, and the eight (8) slices can then be distributed to the IBuffs 116A-C of the appropriate or corresponding engine of engines 0-7 (115A-115C). The eight (8) slices can contain initialization packets for heterogeneous accelerator units. Each slice contains a template program for an accelerator's engine (of engines 115A-C, for example). Based on an engine identifier in a header of each slice the slice will be routed to the respective engine (of engines 115A-C), and that engine's Muff (of 116A-C) will be initialized with the program, which is contained in the slice after the header. The program for a specific engine can be in any slice, and the header determines which engine will receive that slice. A line for the corresponding IBuff can contain, e.g., four (4) instructions with a 32-bit instruction format or two (2) instructions with a 64-bit instruction format.

It should be noted that the AI accelerator 110 can contain more or less than eight (8) engines. Only the use of eight (8) engines will be described in this disclosure although use of more or fewer engines is contemplated. Once the usable machine code from the template accelerator code, with actual values, included instead of variables, is distributed, then the AI accelerator can begin to execute the variable replaced AI accelerator code, read tensor data, and perform AI operations.

Figure 3:
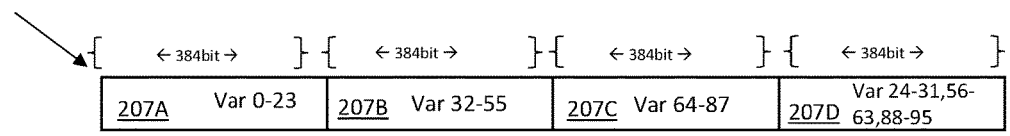
FIG. 3 is a schematic representation of components used in variable replacement, according to some embodiments of the present disclosure.
Figure 3:
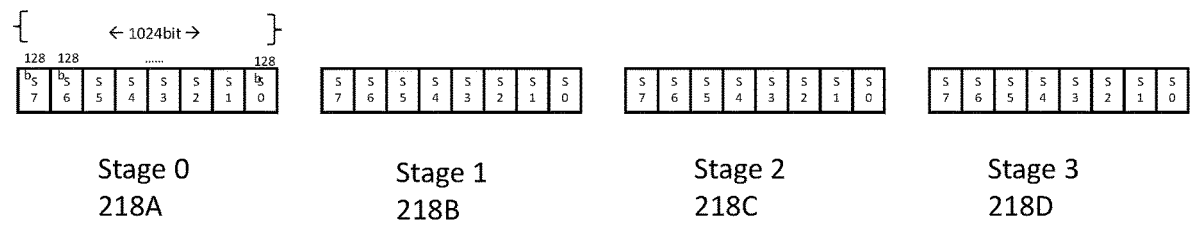

FIG. 3 illustrates how the variable lookup table or variables are partitioned in a latch bank 214 into four (4) segments/portions of variables (207A-D) that are used in four (4) stages of variable replacement stages 0-3 (218A-D). For instance, as shown, the 96 variables in the variable lookup table in latch bank 214 are divided or grouped into four groups with 24 variables each, including the ranges of: variables [0-23] 207A; variables [32-55] 207B; variables [64-87] 207C; and variables [24-31, 56-63], and [88-95] 207D. Variables [0-23] from a variable lookup table are evaluated in stage 0 (218A), variables [32-55] are evaluated in stage 1 (218B), variables [64-87] are evaluated in stage 2 (218C), and variables [24-31, 56-63, 88-95] are evaluated in stage 3 (218D). Each stage of variable replacement can look for up to 24 variables. Each of the variable replacement engines 0-3 (118A-D in FIG. 2) is responsible for replacing variables with actual values in one of the four (4) different stages (stage 0-3), respectively. For example, variable replacement engine 0 (such as 118A in FIG. 2) performs variable replacement in stage 0 (218A).

Init flit of the template accelerator code 108 will each move through the variable replacement engines 118A-D separately in sequential cycles. Each init flit includes 1024 bits. The init flit are each split into 8 slices (indicated as S0-S7 in FIG. 3) of 128 bits each.

FIG. 4 includes a table showing a variable number grouping per stage (0-3), as stages 0-3 (218A-D) in FIG. 3. The table shows one process of decoding of variable indices to determine which stage, of stages 0-3 of variable replacement, certain variables will be subject to a replacement within. In order to decode a variable index, 7 bits can be examined. In order to determine the stage groupings, as in FIG. 4, two (2) bits in the binary representation/code (having a total of seven (7) bits) for each variable number are specifically evaluated. In the table, the left column is the decimal value of the variable, and the right column is the binary representation. If the left-most two (2) bits of the binary representation/code is "00," then the variable number is in stage 0. If the left-most two (2) bits are "01," then the variable number is in stage 1. If the left-most two (2) bits are "10," then the variable number is in stage 2. If the third and fourth bits from the left are "11," then the variable number is in stage 3.

Variable number grouping, or decoding, can be done using any suitable method and is not limited to the process used to form the table of FIG. 4. The process described reduces the complexity of decoding in the variable replacement process. Two (2) bits in the binary code determine what stage during which the variable can be subject to a variable replacement within the AI accelerator 110 (FIG. 2). The other five (5) bits in the binary code of a variable represent the variable number.

Figure 5:
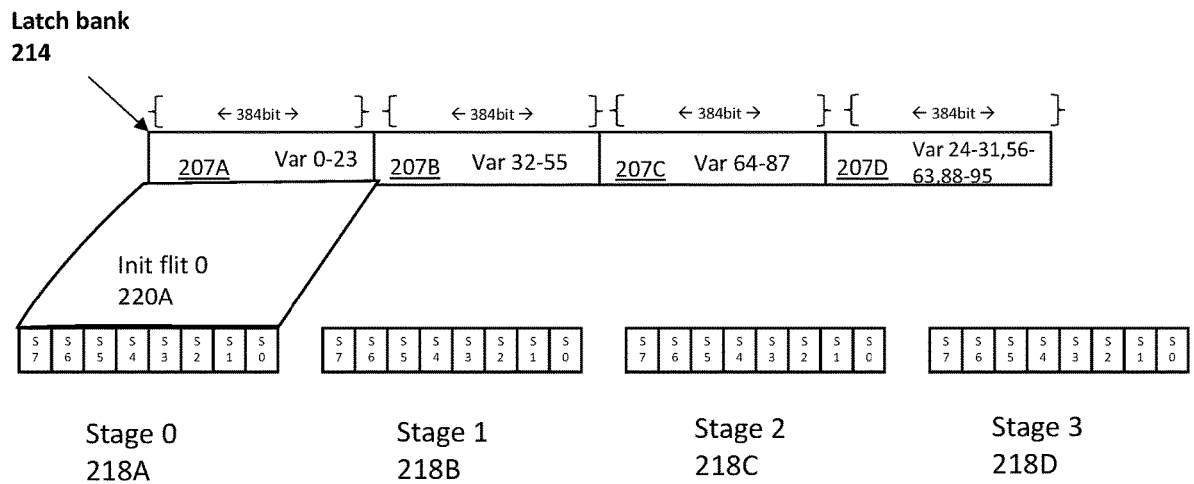
FIGS. 5-8 are schematic representations of operations of a variable replacement process), according to some embodiments of the present disclosure.

FIGS. 5-8, which follow FIG. 4 in subsequent process operations, illustrate schematic representations of an embodiment of variable replacement in an AI accelerator using a "pipeline" of four (4) stages/engines. As shown in FIG. 5, a first init flit 0 (220A) moves from the scratchpad 117 (see FIG. 2) to the first stage, which is a stage 0 (218A) that corresponds to the variable replacement engine 0 (118A in FIG. 2). If a trigger bit is recognized that pertains to the stage 0 (218A) as described above with regard to FIG. 4, then at least one of the variables 0-23 in the init flit 0 (220A) will be replaced with an actual value. Variable replacement is performed in the stage 0 (218A) if the trigger bit is present or recognized, but is not performed if not present or recognized. The trigger bit is cleared proceeding a performed variable replacement. The stage 0 (218A) corresponds to a portion of the variable lookup table corresponding to variables 0-23 (207A) in the latch bank 214.

Figure 6:
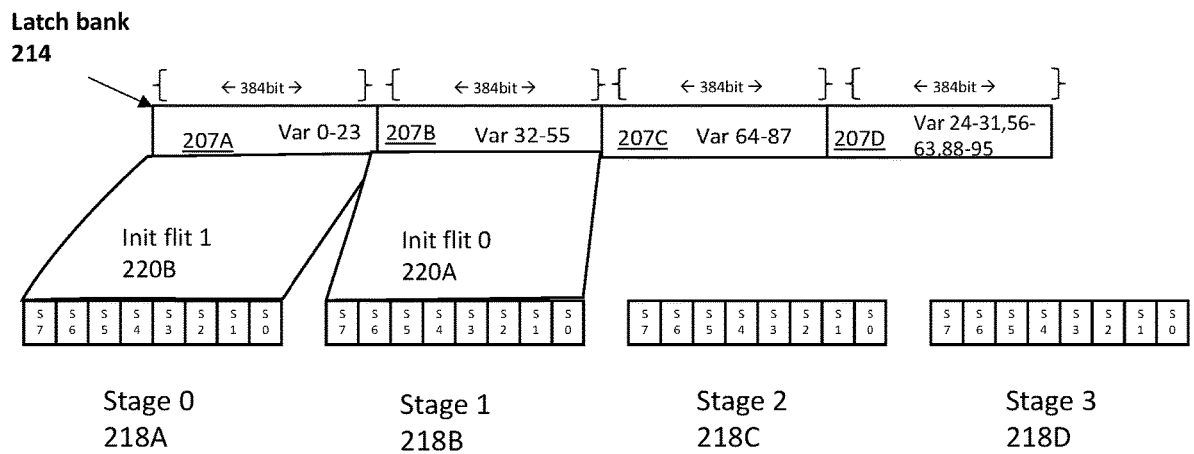

Next, in FIG. 6, the init flit 0 (220A) is shown moved from the stage 0 (218A) to a stage 1 (218B) that corresponds to the variable replacement engine 1 (in FIG. 2), and the variable lookup table portion including variables 32-55 (207B) in the latch bank 214. Variable replacement of any of variables 32-55 is performed if necessary (if an applicable trigger bit is recognized). The init flit 0 (220A) moves on through the subsequent stages. Since the stage 0 (218A) is opened up by the movement of the init flit 0 (220A) to the stage 1 (218B), an init flit 1 (220B) is moved into the stage 0 (218A) to begin a second cycle of variable replacement.

Figure 7:
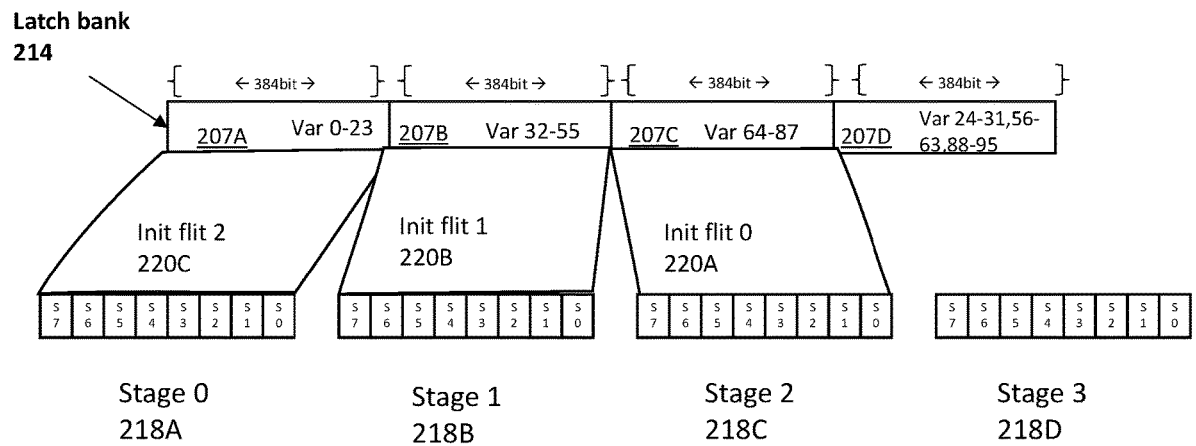

In FIG. 7, the init flit 0 (220A) is moved to a stage 2 (218C) corresponding to the variable replacement engine 2 (118C in FIG. 2). If any of variables 64-87 in the init flit 0 (220A) needs replacement, then there is variable replacement with an actual value in the stage 2 (218C). The init flit 0 (220A) continues to move on. Also, shown, the init flit 1 (220B) is moved to stage 1 (218B), and an init flit 2 (220C) is moved into stage 0 (218A) in another cycle of variable replacement. This process continues and fills all of the stages 0-3 (218A-D) until all init flit of a template accelerator code are processed.

Figure 8:
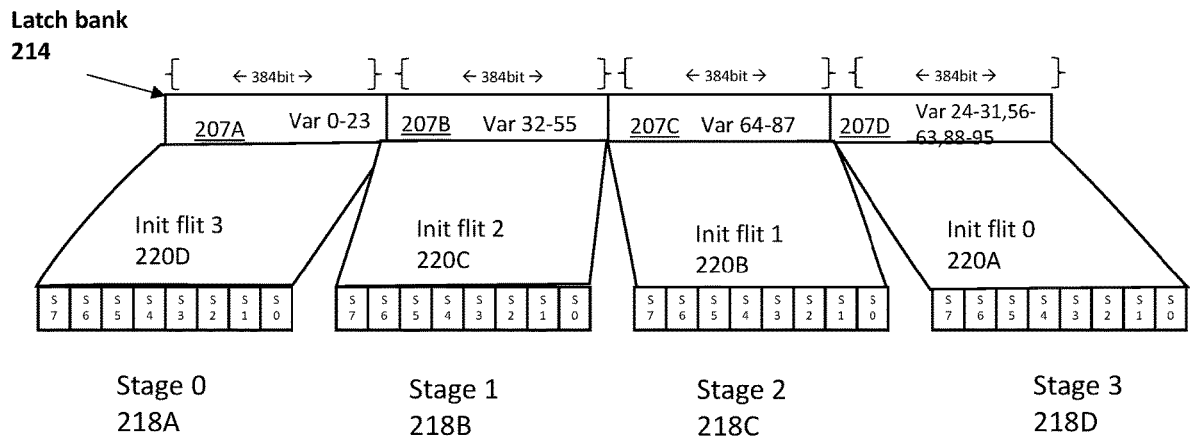

In FIG. 8, all four (4) stages 0-3 (218A-D) include init flit 0-3 (220A-D), respectively. Once one of the plurality of init flit that moves through stages 0-3 undergoes variable replacement in any one of the stages 0-3 (218A-D), that particular int flit moves through the other stages without any variables being replaced. This is ensured by clearing the trigger bit of that particular init data flit upon a successful variable replacement.

Figure 9:
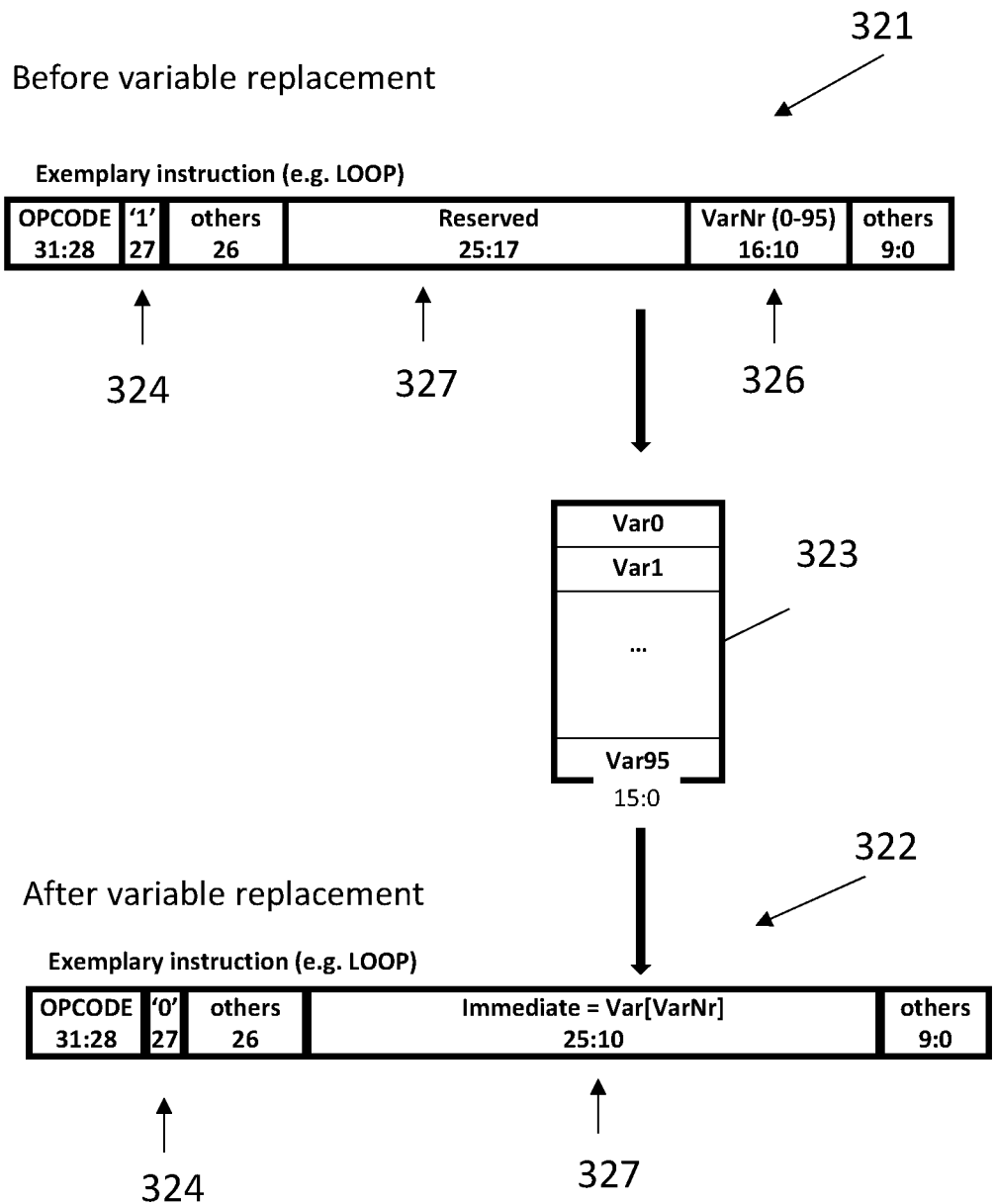
FIG. 9 is a schematic representation of an example instruction before and after variable replacement, according to some embodiments of the present disclosure.

FIG. 9 illustrates an example instruction (e.g., LOOP) before (321) and after (322) variable replacement/substitution. In order to trigger variable replacement of an instruction, a trigger bit 324 can be present. The trigger bit 324 can be used to notify the disclosed system (such as in FIG. 2) that variable replacement is necessary. The trigger bit 324 appears in or is located in the number 27 position in the code in the example shown. The trigger bit 324 has a binary representation of a "1" before variable replacement.

Variables in the code example of FIG. 9, before variable replacement 321, are located in positions "16:10" (i.e., positions 10-16), and are labelled 326. These variables are interpreted as variable numbers if the trigger bit is a "1," as in the example. Otherwise, those bits are interpreted as a non-replaceable part of the instruction, e.g., an immediate field containing a constant. A reserved space, labelled as 326, is located in positions 25:17 (i.e., positions 17-25). A variable lookup table 323 is used in order to provide actual values for variables that appear in the code before variable replacement 321. The trigger bit 324, in position 27, has a binary representation of a "0," as shown in the code after variable replacement 322. As a result, the trigger variable is effectively cleared. Also, after variable replacement, actual values are entered into the positions 25:10 (i.e., 10-25). The instructions shown in FIG. 9, however, are just one example of many possible situations in which variable replacement will take place according to the present disclosure. Variable replacement, such as in this example, advantageously takes place in the AI accelerator itself "on the fly," such as in the system shown in FIG. 2.

It is also contemplated by the disclosure that actual values from the variable lookup table can be replaced in a position or positions in an instruction that is/are not included in the variable numbers. As an example, a variable number could be contained in bits 26:20, and an actual replacement could happen on bits 19:4.

Figure 10:
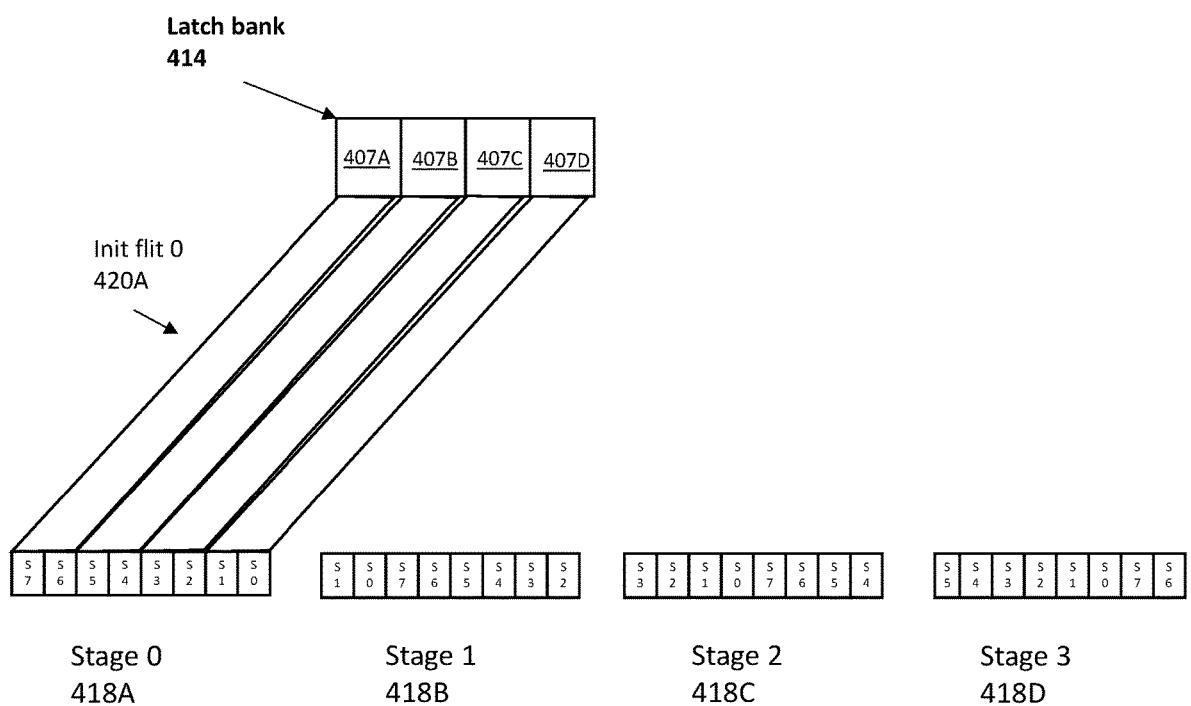
FIGS. 10-13 are schematic representations of operations of a variable replacement process, according to some embodiments of the present disclosure.

FIGS. 10-13 illustrate a schematic representation of another embodiment of a process for variable replacement within the disclosed system (such as in FIG. 2) that can be completed in four (4) stages. As shown in FIG. 10, a first init flit 0 (420A) moves from the scratchpad 117 (see FIG. 2) to the first stage, which is a stage 0 (418A) that corresponds to the variable replacement engine 0 (118A in FIG. 2). In this embodiment, the variable lookup table or variables are partitioned in a latch bank 414 into four (4) segments/portions of variables (407A-D) that are used in all four (4) stages of variable replacement (stages 0-3 (418A-D)). For instance, 96 variables in the variable lookup table in latch bank 414 are divided or grouped into four groups with 24 variables each, including the ranges of: variables [0-23] 407A; variables [32-55] 407B; variables [64-87] 407C; and variables [24-31], [56-63], and [88-95] 407D. Variables in all four (4) groups of the variable lookup table (407A-D), are used in each of the stages 0-3 (418A-D) of the process. However, each portion of the variable lookup table (407A-D) can be compared to only two (2) of the eight (8) slices of the init flits in each stage. For example, in stage 0 (418A), variable lookup table portion 407A can be compared to slices 6 and 7 (S6, S7) of stage 0 (418A), variable lookup table portion 407B can be compared to slices 4 and 5 (S4, S5), variable lookup table portion 407C can be compared to slices 2 and 3 (S2, S3), and variable lookup table portion 407D can be compared to slices 0 and 1 (S0, S1). Variable replacement is performed during this stage if necessary.

Figure 11:
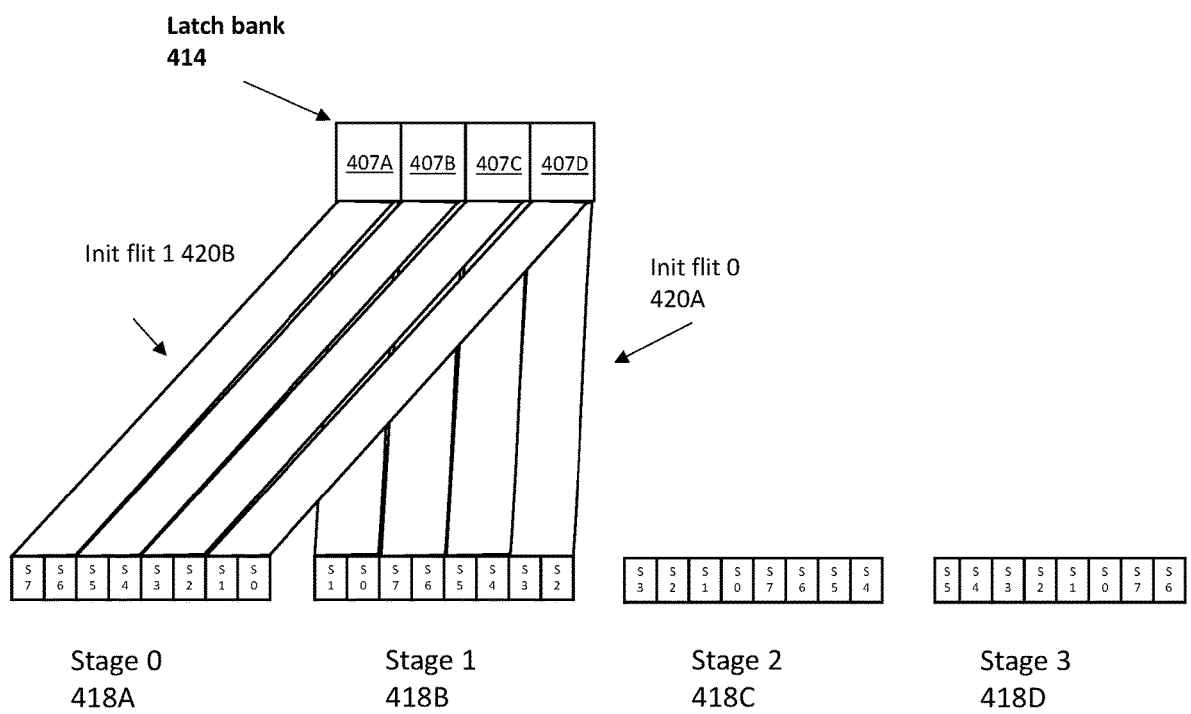

Next, as shown in FIG. 11, the init flit 0 420A can be moved to stage 1 (418B), and another init flit, init flit 1 420B, can enter stage 0 (418A) for a start of another cycle. In stage 1 (418B), the variable lookup table portions 407A-D can be compared to two (2) different slices of the init flit 0 (420A) from those evaluated in stage 0. For example, variable lookup table portion 407A can be compared to slices 0 and 1 (S0, S1) of init flit 0 (420A), variable lookup table portion 407B can be compared to slices 6 and 7 (S6, S7), variable lookup table portion 407C can be compared to slices 4 and 5 (S4, S5), and variable lookup table portion 407D can be compared to slices 2 and 3 (S2, S3). The init flit 1 (420B) in stage 0 (418A) can be compared to the variable lookup table portions using pairs of slices of the init flit 1 (420B).

Figure 12:
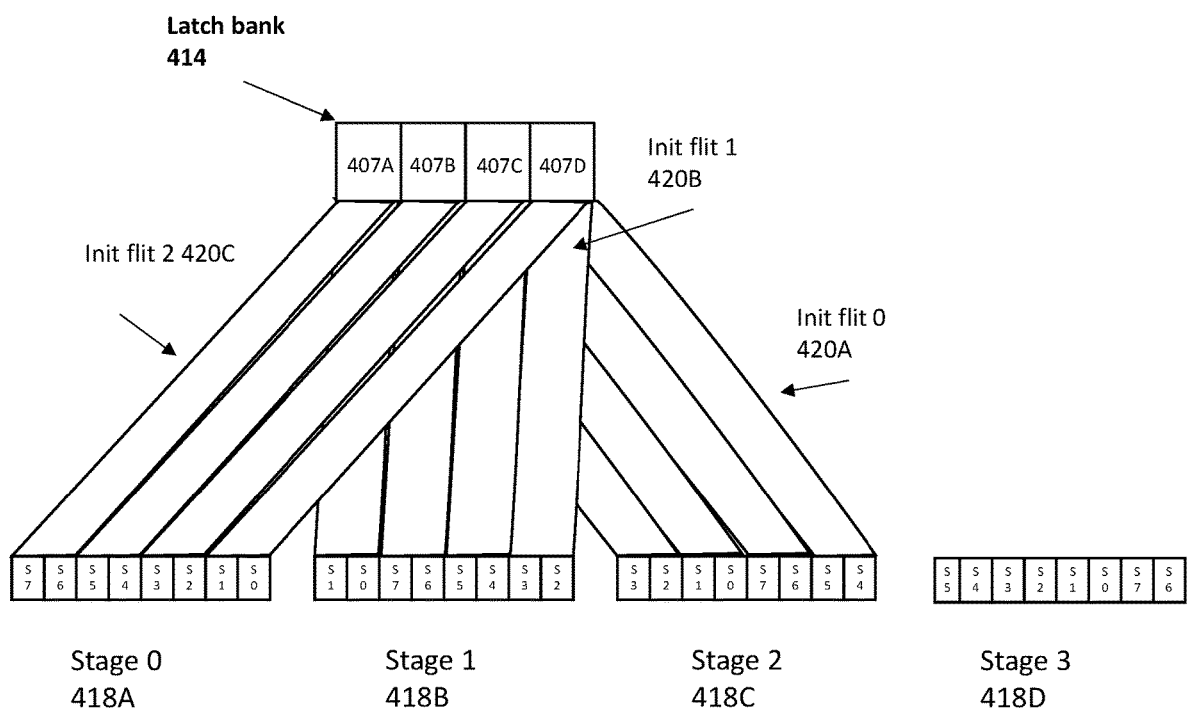
Figure 13:
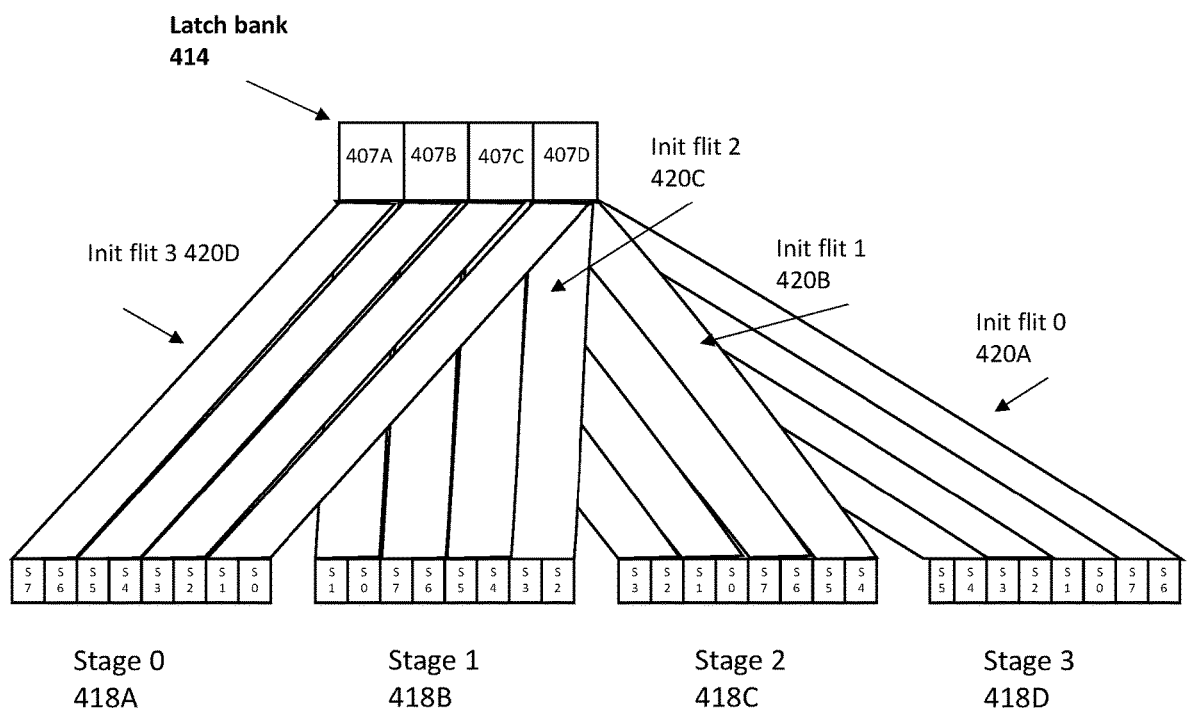

FIG. 12 illustrates a next operation in which the init flit 0 (420A) is moved to stage 2 (418C), the init flit 1 (420B) is moved to stage 1 (418B), and an init flit 2 (420C) is introduced to stage 0 (418A). Different pairs of slices of init flit 0 (420A) are compared to different portions of the variable bank (407A-D) in stage 2 (418C) to check for necessary variable replacement as compared to the earlier two stages. Similarly, in FIG. 13, in a next operation, the init flit 0 is moved to stage 3 (418D), the init flit 1 (420B) is moved to stage 2 (418C), the init flit 2 (420C) is moved to stage 1, and an init flit 3 420D) is introduced to stage 0 (418A). By the time all of the init flit 0-3 (420A-D)) have moved through all four (4) stages of the process, all pairs of slices of the code in the init flit (0-3) will have been compared to all of the portions of the variable lookup table (407A-D), and any necessary variable replacement will have taken place in one of the four (4) stages for each of the init flit 0-3 (420A-D).

The two embodiments of variable replacement, in FIGS. 5-8 and 10-13, are examples. Other embodiments of such processes are contemplated that can be extended for any number of variables by adding pipeline stages, for example.

Figure 14:
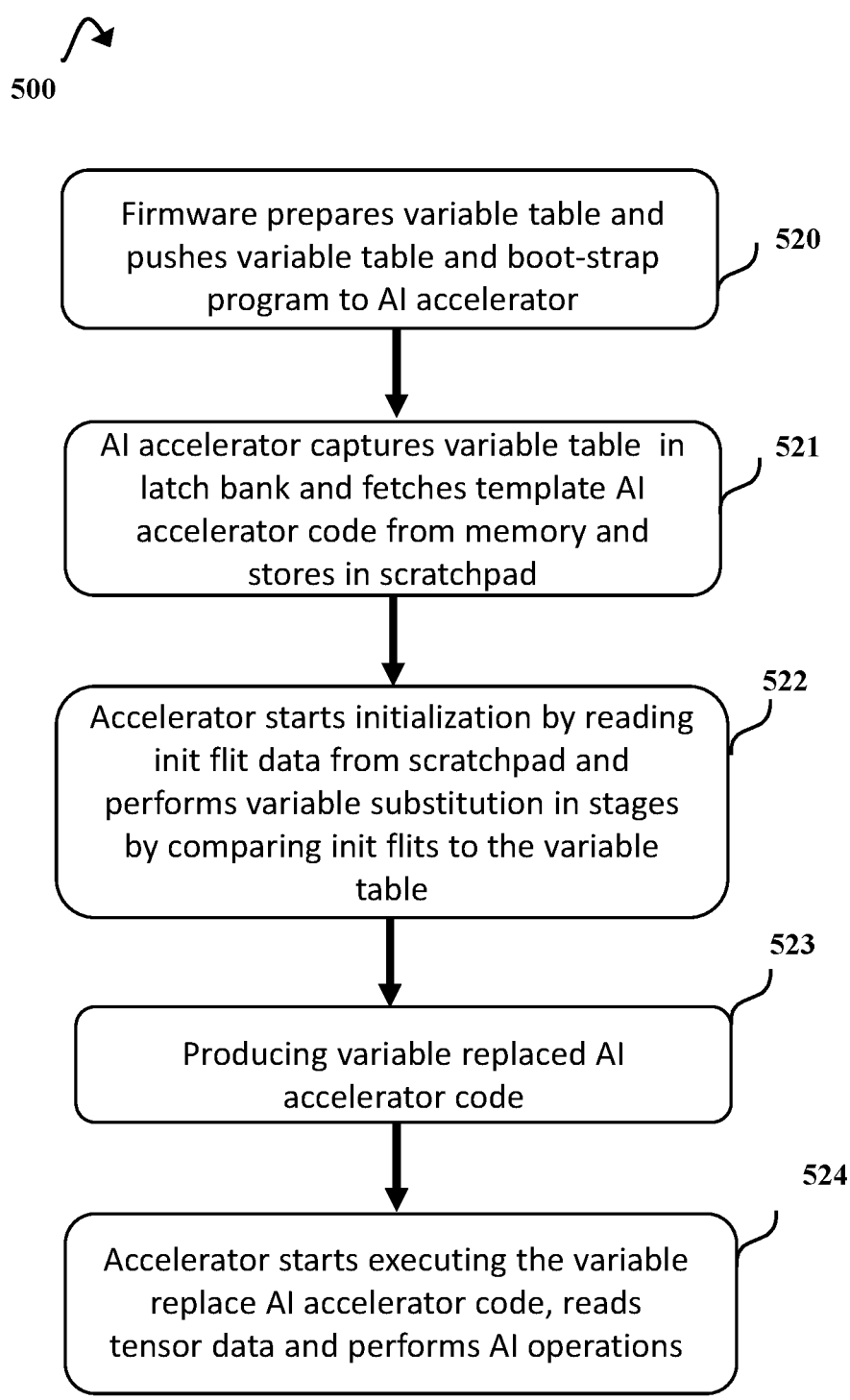
FIG. 14 is a flow diagram illustrating a process for variable replacement in an AI accelerator, according to some embodiments of the present disclosure.

FIG. 14 is a flow diagram illustrating an embodiment of the disclosure of a process 500 for variable replacement in an AI accelerator. In an operation of process 500, firmware prepares a variable lookup table and pushes it and boot-strap code to an AI accelerator (see operation (520).

In a next operation, the AI accelerator captures the variable lookup table in a latch bank and fetches template accelerator code from memory, and stores it in a scratchpad (see operation 521). Next, the AI accelerator starts initialization by reading init flit data of template accelerator code from the scratchpad and performs variable substitution "on the fly" (see operation 522). Variable replacement is performed in stages by comparing init flits to the variable lookup table. Variable replaced AI accelerator code is produced (see operation 523). The AI accelerator then starts execution of the variable replaced AI accelerator code, reads tensor data, and performs AI operations (see operation 524).

Figure 15:
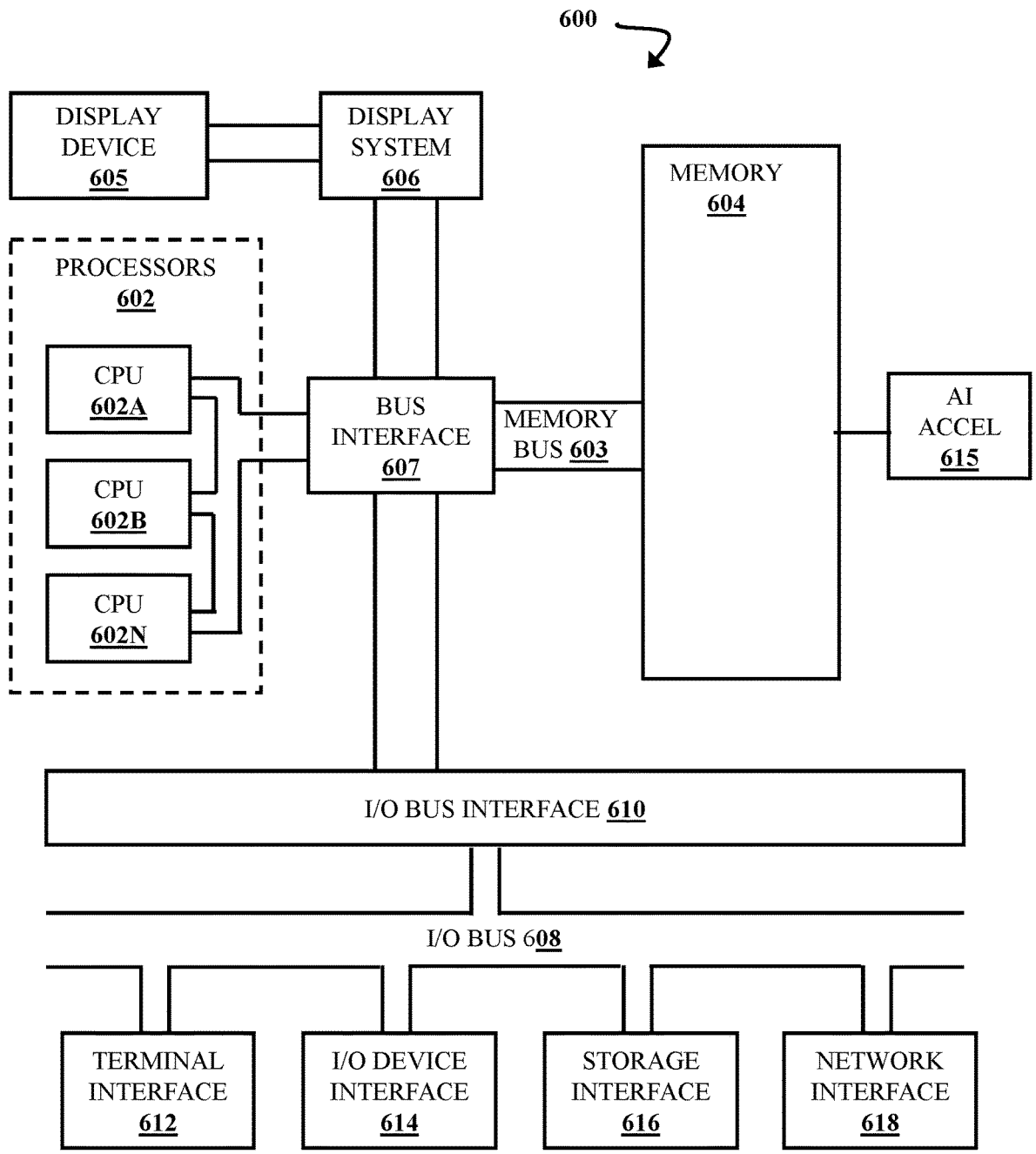
FIG. 15 illustrates a high-level block diagram of an example computer system that may be used in implementing one or more of the methods, tools, and modules, and any related functions, described herein, according to some embodiments of the present disclosure.

Referring now to FIG. 15, shown is a high-level block diagram of an example computer system 600 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 600 may comprise one or more CPUs 602, a memory subsystem 604, a terminal interface 612, an AI accelerator 615, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610. It is contemplated that any suitable type of processor can be used rather than a CPU, for example.

The computer system 600 may contain one or more general-purpose programmable central processing units (CPUs) 602A, 602B, 602C, and 602D, herein generically referred to as the CPU 602. In some embodiments, the computer system 600 may contain multiple processors typical of a relatively large system; however, in other embodiments the computer system 600 may alternatively be a single CPU system. Each CPU 602 may execute instructions stored in the memory subsystem 604 and may include one or more levels of on-board cache.

System memory 604 may include computer system readable media in the form of volatile memory. Computer system 600 may further include other removable/non-removable, volatile/non-volatile computer system storage media. By way of example only, a storage system can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

Although the memory bus 603 is shown in FIG. 15 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or ring or web configurations, multiple hierarchical buses, parallel and redundant paths, or any other appropriate type of configuration. Furthermore, while the I/O bus interface 610 and the I/O bus 608 are shown as single respective units, the computer system 600 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 600 may be a multi-user mainframe computer system, a single-user system, or a server computer or similar device that has little or no direct user interface, but receives requests from other computer systems (clients). Further, in some embodiments, the computer system 600 may be implemented as a desktop computer, portable computer, laptop or notebook computer, tablet computer, pocket computer, telephone, smart phone, network switches or routers, or any other appropriate type of electronic device.

It is noted that FIG. 15 is intended to depict the representative major components of an exemplary computer system 600. In some embodiments, however, individual components may have greater or lesser complexity than as represented in FIG. 15, components other than or in addition to those shown in FIG. 15 may be present, and the number, type, and configuration of such components may vary. Furthermore, the modules are listed and described illustratively according to an embodiment and are not meant to indicate necessity of a particular module or exclusivity of other potential modules (or functions/purposes as applied to a specific module).

In some embodiments, the data storage and retrieval processes described herein could be implemented in a cloud computing environment, which is described below with respect to FIGS. 16 and 17. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but might be able to specify location at a higher-level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 16:
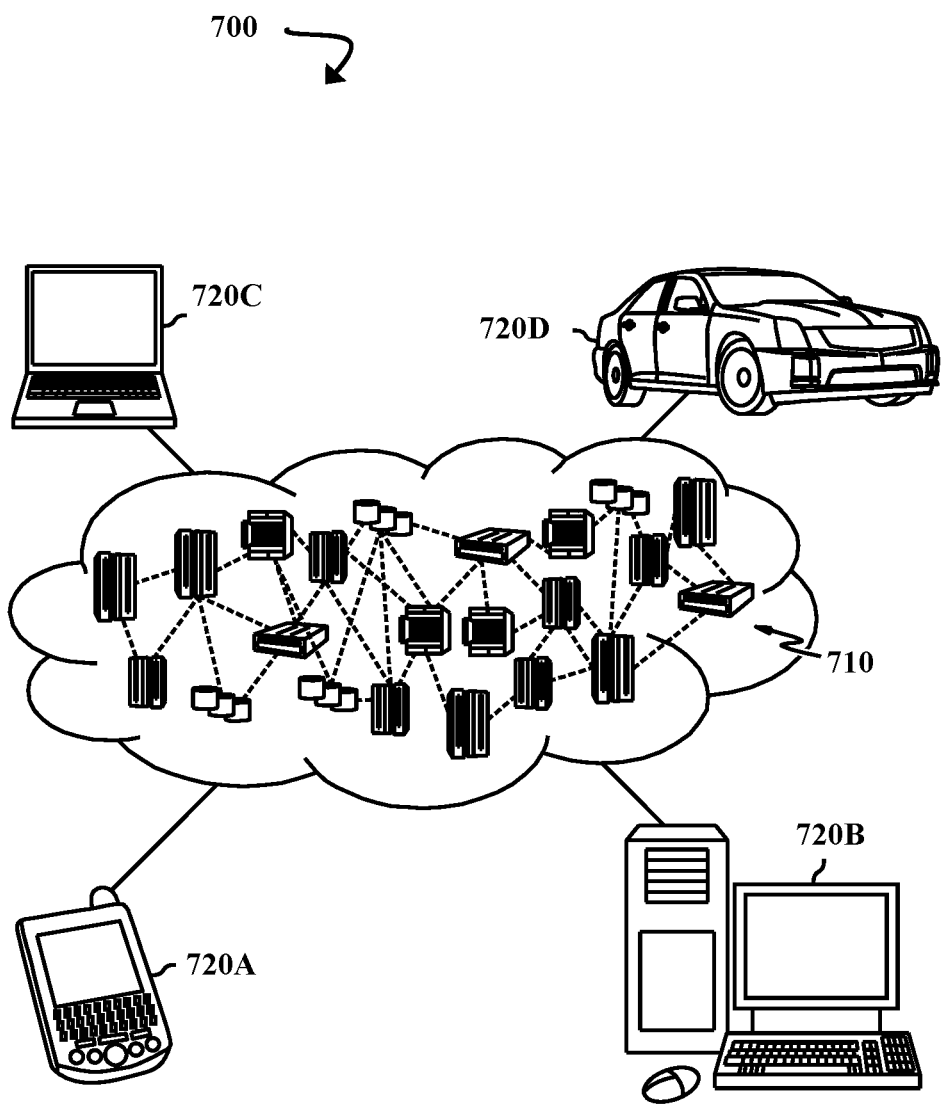
FIG. 16 is a block diagram illustrating a cloud computing environment, according to some embodiments of the present disclosure.

FIG. 16 is a block diagram illustrating a cloud computing environment 700, according to some embodiments of the present disclosure. As shown, cloud computing environment 700 includes one or more cloud computing nodes 710 with which local computing devices used by cloud consumers, such as, for example, personal digital assistant (PDA) or cellular telephone 795A, desktop computer 795B, laptop computer 795C, and/or automobile computer system 795D can communicate. Nodes 711 can communicate with one another. They can be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 720A—720D shown in FIG. 16 are intended to be illustrative only and that computing nodes 710 and cloud computing environment 700 can communicate with any type of computerized device over any type of network and/or network addressable connection (e.g., using a web browser).

Figure 17:
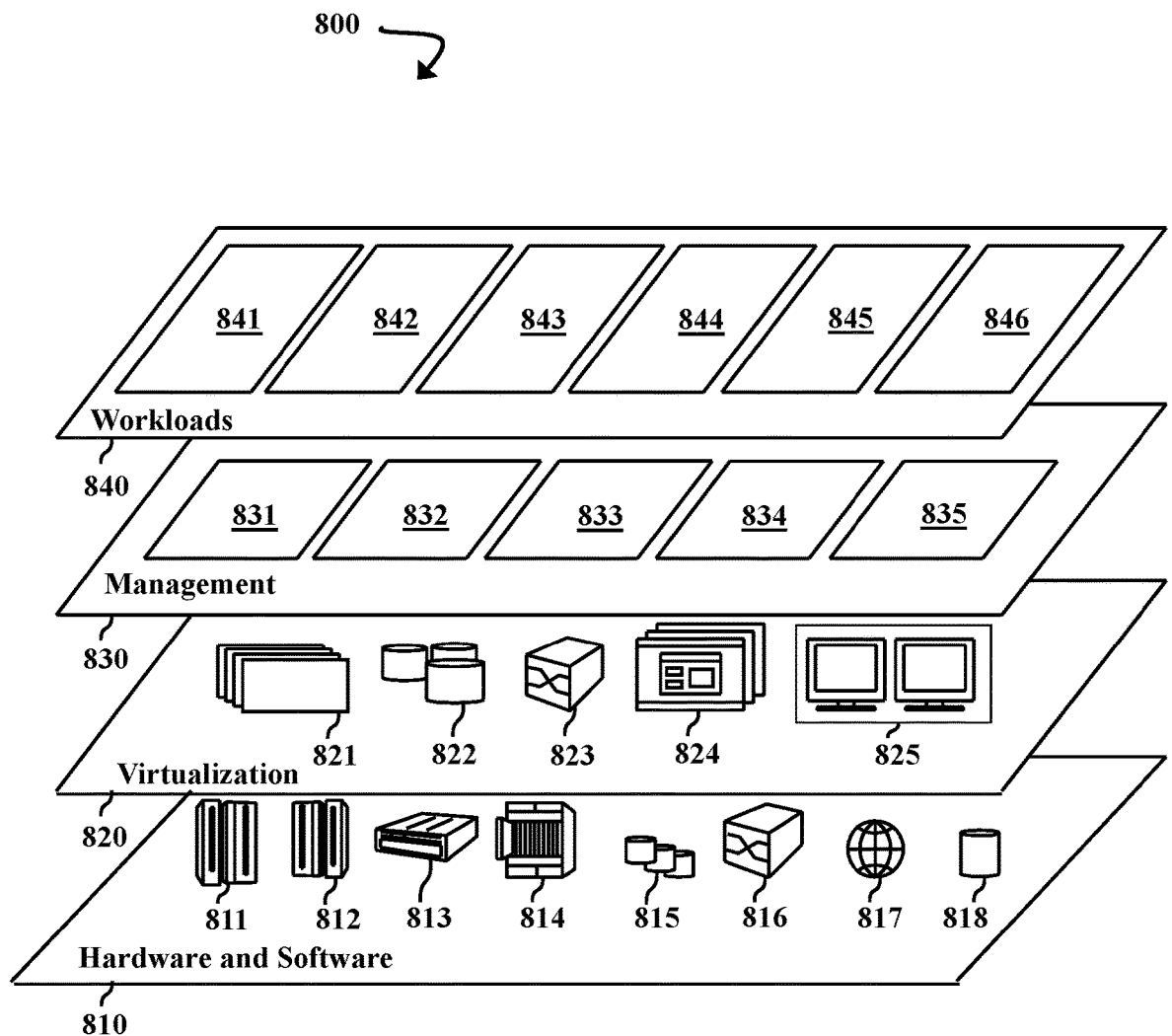
FIG. 17 is a block diagram illustrating a set of functional abstraction model layers provided by the cloud computing environment, according to some embodiments of the present disclosure.

FIG. 17 is a block diagram illustrating a set of functional abstraction model layers 800 provided by the cloud computing environment 700, according to some embodiments of the present disclosure. It should be understood in advance that the components, layers, and functions shown in FIG. 17 are intended to be illustrative only and embodiments of the disclosure are not limited thereto. As depicted, the following layers and corresponding functions are provided:

Hardware and software layer 810 includes hardware and software components. Examples of hardware components include: mainframes 811; RISC (Reduced Instruction Set Computer) architecture-based servers 812; servers 813; blade servers 814; storage devices 815; and networks and networking components 816. In some embodiments, software components include network application server software 817 and database software 818.

Virtualization layer 820 provides an abstraction layer from which the following examples of virtual entities can be provided: virtual servers 821; virtual storage 822; virtual networks 823, including virtual private networks; virtual applications and operating systems 824; and virtual clients 825.

In one example, management layer 830 provides the functions described below. Resource provisioning 831 provides dynamic procurement of computing resources and other resources that are utilized to perform tasks within the cloud computing environment. Metering and Pricing 832 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 833 provides access to the cloud computing environment for consumers and system administrators. Service level management 834 provides cloud computing resource allocation and management such that required service levels are met. Service Level Agreement (SLA) planning and fulfillment 835 provide pre-arrangement for, and procurement of, cloud computing resources for which a future requirement is anticipated in accordance with an SLA.

Workloads layer 840 provides examples of functionality for which the cloud computing environment can be utilized. Examples of workloads and functions that can be provided from this layer include: mapping and navigation 841; software development and lifecycle management 842; virtual classroom education delivery 843; data analytics processing 844; transaction processing 845; and function fingerprinting and code ancestry determination 846.

The present disclosure can be a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be accomplished as one step, executed concurrently, substantially concurrently, in a partially or wholly temporally overlapping manner, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof.

In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

When different reference numbers comprise a common number followed by differing letters (e.g., 100A, 100B, 100C) or punctuation followed by differing numbers (e.g., 100-1, 100-2, or 100.1, 100.2), use of the reference character only without the letter or following numbers (e.g., 100) can refer to the group of elements as a whole, any subset of the group, or an example specimen of the group.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list might be needed. In other words, "at least one of" means any combination of items and number of items might be used from the list, but not all of the items in the list are required. The item can be a particular object, a thing, or a category. For example, without limitation, "at least one of item A, item B, and item C" can include item A, item A and item B, or item B. This example also can include item A, item B, and item C or item B and item C. Of course, any combinations of these items can be present. In some illustrative examples, "at least one of" can be, for example, without limitation, two of item A; one of item B; ten of item C; four of item B and seven of item C; or other suitable combinations.

What is claimed is:

1. A system for variable replacement in a template artificial intelligence (AI) accelerator code, the system comprising:
   at least one memory;
   at least one processor communicatively coupled to the at least one memory, and configured for computing at least one table of variables from a template AI accelerator code; and
   an AI accelerator including a plurality of engines, and communicatively coupled to the at least one processor and the at least one memory;
   wherein the AI accelerator is configured to create a variable replaced AI accelerator code for the plurality of engines of the AI accelerator from the template AI accelerator code by replacing at least one portion of the template AI accelerator code with actual values from the at least one table of variables.

2. The system of claim 1, wherein the AI accelerator further includes a plurality of variable replacement engines that are each configured to replace at least one portion of the template AI accelerator code in one of a plurality of stages with actual values from the at least one table of variables.

3. The system of claim 2, wherein each of the plurality of variable replacement engines is configured to replace variables in the template AI accelerator code with actual values from a portion of the at least one table of variables.

4. The system of claim 1, wherein the processor includes firmware that is configured to push the at least one table of variables to the AI accelerator.

5. The system of claim 1, wherein the AI accelerator is configured to execute the variable replaced AI accelerator code on the plurality of engines.

6. The system of claim 1, wherein the AI accelerator further includes: a memory storage to receive the at least one table of variables from the processor; and, a plurality of variable replacement engines that are each configured to replace at least one portion of the template AI accelerator code in one of a plurality of stages with actual values from the at least one table of variables in the memory storage.

7. The system of claim 1, wherein the template AI accelerator code includes a trigger bit that can be configured to trigger the variable replacement.

8. The system of claim 7, wherein the trigger bit can be configured to be cleared if the at least one portion of the template AI accelerator code includes actual values rather than variables.

9. A system for variable replacement in a template artificial intelligence (AI) accelerator code, the system comprising:
   at least one memory;
   at least one processor communicatively coupled to the at least one memory, and configured for computing at least one table of variables from a template AI accelerator code; and
   an AI accelerator including a plurality of engines, and communicatively coupled to the at least one processor and the at least one memory;
   wherein the AI accelerator is configured to perform a method comprising:
      replacing at least one portion of the template AI accelerator code with actual values from the at least one table of variables;
      creating a variable replaced AI accelerator code; and
      providing the variable replaced AI accelerator code to the engines of the AI accelerator.

10. The system of claim 9, wherein the AI accelerator further includes a plurality of variable replacement engines that are each configured to replace at least one portion of the template AI accelerator code in one of a plurality of stages with actual values from the at least one table of variables.

11. The system of claim 9, wherein the method further comprises:
   executing the variable replaced AI accelerator code on the plurality of engines.

12. The system of claim 9, wherein the template AI accelerator code includes a trigger bit that can be configured to trigger the variable replacement.

13. The system of claim 12, wherein the trigger bit can be configured to be cleared if the at least one portion of the template AI accelerator code includes actual values rather than variables.

14. The system of claim 9, wherein the providing step of the method includes distributing portions of the variable replaced AI code to the plurality of engines.

15. A method of variable replacement in a template artificial intelligence (AI) accelerator code, comprising:
   providing at least one memory;
   providing at least one processor communicatively coupled to the at least one memory, and configured for computing at least one table of variables from a template AI accelerator code;
   providing an AI accelerator including a plurality of engines, and associated with the at least one processor and the at least one memory; and
   the AI accelerator creating a variable replaced AI accelerator code for the engines of the AI accelerator from the template AI accelerator code by replacing at least a portion of the template AI accelerator code with actual values from the at least one table of variables.

16. The method of claim 15, further comprising:
   executing the variable replaced AI accelerator code on the plurality of engines.

17. The method of claim 15, wherein the AI accelerator further includes a plurality of variable replacement engines that are each configured to replace at least a portion of the template AI accelerator code in one of a plurality of stages with actual values.

18. The method of claim 17, wherein each of the plurality of variable replacement engines is configured to replace variables in the template AI accelerator code with actual values from a portion of the at least one table of variables.

19. The method of claim 15, further comprising
   providing portions of the variable replaced AI code to the plurality of engines; and
   executing the portions of the variable replaced AI accelerator code on the plurality of engines.

20. The method of claim 15, wherein the template AI accelerator code includes a trigger bit that can be configured to trigger the variable replacement, and configured to be cleared if the at least one portion of the template AI accelerator code includes actual values rather than variables.

* * * * *